(12) United States Patent
Asokan

(10) Patent No.: US 11,962,859 B2
(45) Date of Patent: Apr. 16, 2024

(54) SYSTEM AND METHOD FOR IMPLEMENTATION OF REGION OF INTEREST BASED STREAMING

(71) Applicant: E-CON SYSTEMS INDIA PRIVATE LIMITED, Chennai (IN)

(72) Inventor: Arun Asokan, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 0 days.

(21) Appl. No.: 17/433,302

(22) PCT Filed: Nov. 18, 2020

(86) PCT No.: PCT/IB2020/060839
§ 371 (c)(1),
(2) Date: Aug. 24, 2021

(87) PCT Pub. No.: WO2022/003412
PCT Pub. Date: Jan. 6, 2022

(65) Prior Publication Data
US 2023/0115097 A1 Apr. 13, 2023

(30) Foreign Application Priority Data
Jun. 30, 2020 (IN) .............................. 202041027809

(51) Int. Cl.
*H04N 21/4728* (2011.01)
*H04N 19/167* (2014.01)
*H04N 21/2343* (2011.01)

(52) U.S. Cl.
CPC ....... *H04N 21/4728* (2013.01); *H04N 19/167* (2014.11); *H04N 21/234345* (2013.01)

(58) Field of Classification Search
CPC ............. H04N 21/4728; H04N 19/167; H04N 21/234345; H04N 23/611; H04N 7/188;
(Continued)

(56) References Cited

U.S. PATENT DOCUMENTS

2006/0062478 A1  3/2006  Cetin et al.
2010/0322489 A1* 12/2010  Tizhoosh ................ G06T 7/174
                                                                 345/157
(Continued)

FOREIGN PATENT DOCUMENTS

WO          200004957 A2      8/2000

*Primary Examiner* — Richard T Torrente
(74) *Attorney, Agent, or Firm* — Jason C. Cameron

(57) ABSTRACT

A system for implementation of region of interest-based streaming is disclosed. The system includes an image acquisition unit to capture a stream of images. The system also includes a connection interface including a video class extension module to provide coordinates corresponding to the region of interest of the stream of images. The connection interface includes a descriptor module to receive capabilities associated with the stream of images. The capabilities include an initial frame size, a predefined data format and a region of interest. The descriptor module streams the predefined data format by representing the predefined data format as a compressed data format thereby streaming the initial frame size dynamically in a single video stream format and a video frame configuration. The system includes a streaming application layer to analyze the initial frame size and the compressed data format based on the coordinates. The streaming application layer displays the stream of images corresponding to the region of interest in a resultant frame size.

10 Claims, 4 Drawing Sheets

(58) Field of Classification Search
CPC ......... H04N 21/4223; H04N 21/43632; H04N 23/80; G06V 40/171; G06V 20/52
See application file for complete search history.

(56) References Cited

U.S. PATENT DOCUMENTS

| | | | |
|---|---|---|---|
| 2012/0147192 A1* | 6/2012 | Wright | H04N 21/4334 348/E7.085 |
| 2014/0320666 A1* | 10/2014 | Badawy | H04N 7/18 348/169 |
| 2016/0203584 A1 | 7/2016 | Wu et al. | |
| 2019/0320189 A1* | 10/2019 | Cooper | H04N 19/182 |
| 2020/0394458 A1* | 12/2020 | Yu | G06V 10/82 |
| 2021/0168376 A1* | 6/2021 | Zhu | B64C 39/024 |
| 2021/0358121 A1* | 11/2021 | Bangia | G06V 10/764 |

* cited by examiner

SYSTEM AND METHOD FOR IMPLEMENTATION OF REGION OF INTEREST BASED STREAMING

CROSS-REFERENCE TO RELATED APPLICATION

This National Phase Application claims priority from a Complete patent application filed in India having Patent Application No. 202041027809, filed on Jun. 30, 2020, and titled "SYSTEM AND METHOD FOR IMPLEMENTATION OF REGION OF INTEREST BASED STREAMING".

BACKGROUND

Embodiments of the present disclosure relates to image processing and more particularly to a system and method for implementation of region of interest-based streaming.

The USB video device class (UVC) is a USB device class that describes devices capable of streaming video such as webcams, digital camcorders, transcoders, analog video converters and still-image cameras. In many video distribution systems, a source image is captured at a high bit depth, such as 10-16 bits per sample bps for each of three primary colours and is converted to a lower bit depth. However, such conversion, or remapping, reduces bitrate but may result in a reduction in video quality. Such methodology may cause banding and loss of detail. It would be desirable to improve video quality without unnecessarily increasing the bitrate requirements. In addition to creating additional streams by using increased native resolutions, viewing quality may be enhanced by creating streams with a higher bit depth. Conversion from a high bit depth to a low hit depth may result in a variety of video quality problems, such as loss of detail, reduced dynamic range, image artifacts, and problems at the extremes of the brightness scale. Loss of detail causes flattening or complete loss of fine textures. Reduced bit depth may result in black colours being less black, and white colours being less white. Brightness problems may include issues with objects in dark or bright sections of the image appearing severely degraded or even washed out. The region of interest-based streaming is not supported by a core UVC1.0 standard.

To overcome the aforementioned problems, a region of interest-based streaming developed in UVC. The ROI based streaming feature requires ability to stream different resolutions from the image sensor dynamically. However, as the resolution changes causes the frame size also to change dynamically. While streaming uncompressed data formats such as YUV or RGB, the UVC standard expects the frame size to be a constant for that resolution. Such condition disables the possibility of changing the resolution dynamically as required since it also changes the frame size.

Hence, there is a need for an improved system and method to implement region of interest-based streaming to address the aforementioned issues.

BRIEF DESCRIPTION

In accordance with an embodiment of the present disclosure, a system for implementation of region of interest-based streaming is provided. The system includes an image acquisition unit configured to capture a stream of images. The system also includes a connection interface operatively coupled to the image acquisition unit. The connection interface includes a video class extension module configured to provide a plurality of coordinates corresponding to the region of interest of the stream of images. The connection interface also includes a descriptor module configured to receive a plurality of capabilities associated with the stream of images captured by the image acquisition unit, where the plurality of capabilities includes an initial frame size, a predefined data format and a region of interest. The descriptor module is also configured to stream the predefined data format by representing the predefined data format as a compressed data format thereby streaming the initial frame size dynamically in a single video stream format and a video frame configuration. The system further includes a streaming application layer configured to analyze the initial frame size and the compressed data format based on the plurality of coordinates provided by the video class extension module. The streaming application layer is further configured to display the stream of images corresponding to the region of interest in a resultant frame size upon interpretation to implement the region of interest-based streaming.

In accordance with another embodiment of the present disclosure, a method for implementation of region of interest-based streaming is provided. The method includes capturing, by an image acquisition unit, a stream of images. The method also includes providing, by a video class extension module, a plurality of coordinates corresponding to the region of interest of the stream of images. The method further includes receiving, by a descriptor module, a plurality of capabilities associated with the stream of images captured by the image acquisition unit, wherein the plurality of capabilities comprises an initial frame size, a predefined data format and a region of interest. The method further includes streaming, by the descriptor module, the predefined data format by representing the predefined data format as a compressed data format thereby streaming the initial frame size dynamically in a single video stream format and a video frame configuration. The method further includes analysing, by a streaming application layer, the initial frame size and the compressed data format based on the plurality of coordinates provided by the video class extension module. The method further includes displaying, by the streaming application layer, the stream of images corresponding to the region of interest in a resultant frame size upon interpretation to implement the region of interest-based streaming.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with accompanying figures in which.

Figure 1:
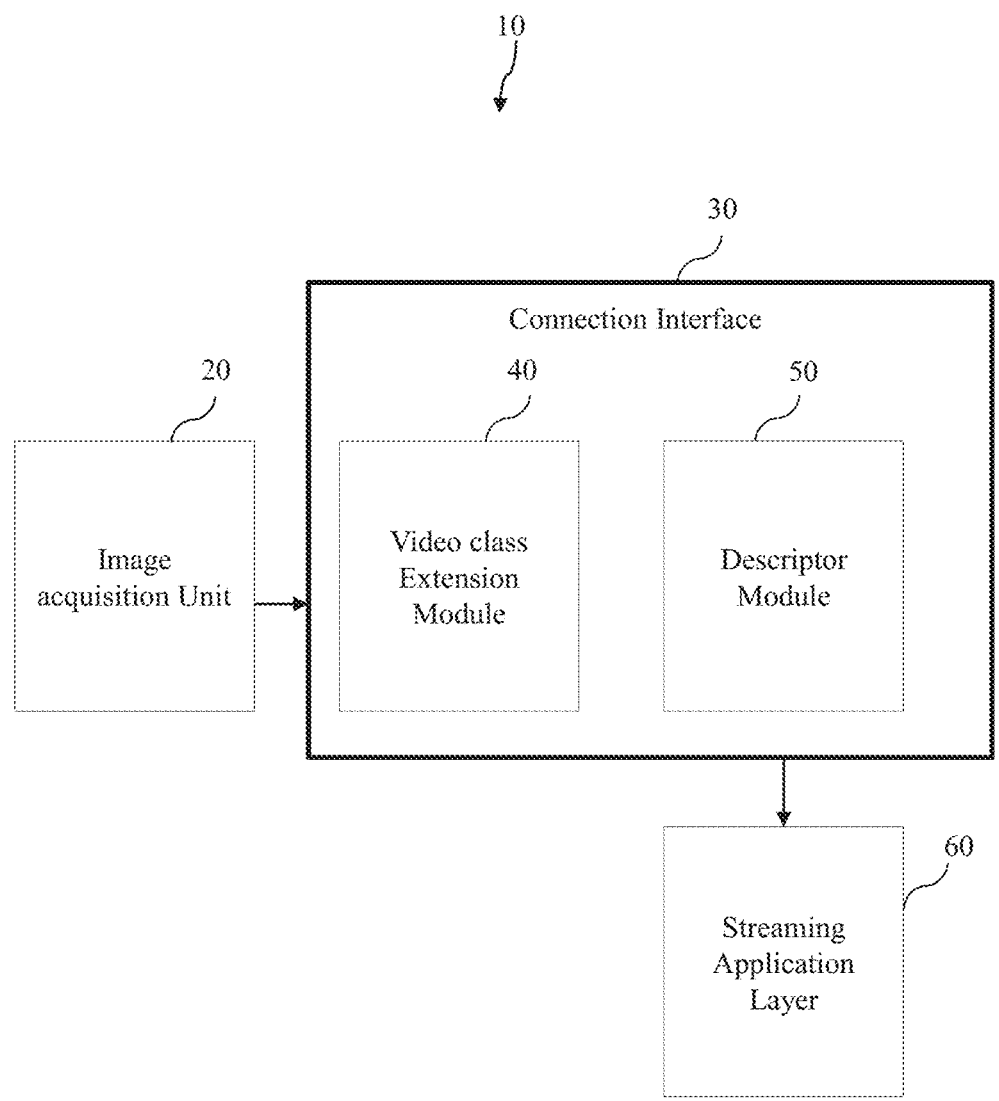
FIG. 1 is a block diagram representation of a system for implementation of region of interest-based streaming in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method 250 that comprises a list of steps does not include only those steps but may include other steps not expressly listed or inherent to such a process or method 250. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for implementation of region of interest-based streaming. The system includes an image acquisition unit configured to capture a stream of images. The system also includes a connection interface operatively coupled to the image acquisition unit. The connection interface includes a video class extension module configured to provide a plurality of coordinates corresponding to the region of interest of the stream of images. The connection interface also includes a descriptor module configured to receive a plurality of capabilities associated with the stream of images captured by the image acquisition unit, where the plurality of capabilities includes an initial frame size, a predefined data format and a region of interest. The descriptor module is also configured to stream the predefined data format by representing the predefined data format as a compressed data format thereby streaming the initial frame size dynamically in a single video stream format and a video frame configuration. The system further includes a streaming application layer configured to analyze the initial frame size and the compressed data format based on the plurality of coordinates provided by the video class extension module. The streaming application layer is further configured to display the stream of images corresponding to the region of interest in a resultant frame size upon interpretation to implement the region of interest-based streaming.

FIG. 1 is a block diagram representation of a system 10 for implementation of region of interest-based streaming in accordance with an embodiment of the present disclosure. The system 10 includes an image acquisition unit 20 to capture a stream of images. In one embodiment, the stream of images may be referred as an input video. In one exemplary embodiment, the input video may include a conventional audio-video (AV) streams, which may be transmitted to a client device on the basis of a suitable media streaming protocol. The convention audio-video stream may be transmitted to the client device on the basis of a broadcast, multicast or unicast scheme and an associated data streaming protocol including, but not limited to, RIP, HTTP progressive download, HTTP adaptive streaming, (HEVC) tiled streaming or the like.

In a specific embodiment, the image acquisition unit 20 may include USB video class camera. In such an embodiment, the image acquisition unit 20 may include a colour camera and a non-colour sensor camera. The colour cameras are categorized as an RUB camera or a YUV camera and non-colour cameras are categorized as a gray scale camera, an infrared (IR) camera and a depth camera. The USB video class (UVC) driver supports colour camera and the non-colour sensor camera.

Furthermore, the system 10 includes a connection interface 30 operatively coupled to the image acquisition unit 40. The connection interface 30 includes a video class extension module 40 which provides coordinates corresponding to the region of interest of the stream of images. In one embodiment, the coordinates may define a maximum limit and a minimum limit of height and width of the region of interest. The video class extension module 40 adds a custom control which specifies the four coordinates of the images. The coordinates may be represented by $X_0$, $X_1$ which are the minimum and maximum limits in width and $Y_0$, $Y_1$ which are the minimum and maximum limits in height.

The connection interface 30 also includes a descriptor module 50 which receives capabilities associated with the stream of images captured by the image acquisition unit 20. The capabilities include an initial frame size, a predefined data format and a region of interest. As used herein, the initial frame size is associated with resolution. In USB video class, the frame size of a configuration is defined by width, height and bits per pixel as show below:

Frame size=Width×Height×Bits per pixel

The frame size may be defined in VS_FORMAT and VS_FRAME descriptors. Also, there must be a defined list of VS_FRAME descriptors which limits the possible resolutions that may be supported through the image acquisition unit 20. In one embodiment, the predefined data format may include a YUV data format or a raw data format. As used herein, the YUV is a file extension for a raster graphics file often associated with the colour space pixel format. The YUV files may include bitmap image data stored in the YUV format, which splits colour across Y, U, and V values and stores the brightness (luminance) as the Y value, and the colour (chrominance) as U and V values. In a specific embodiment, the region of interest refers to any arbitrary region or section or object of user's interest present in a video. The user may select a portion of video and interact simultaneously.

Moreover, the descriptor module 50 streams the predefined data format by representing the predefined data format as a compressed data format thereby streaming the initial frame size dynamically in a single video stream format and a video frame configuration. In one embodiment, the compressed data format may include a MJPEG data format. More specifically, the descriptor module 50 uses the property of MJPEG format which is a compressed data format and represent the configuration that the image acquisition unit 20 supports as the compressed data type, and further may stream image frames with no restriction on the frame size. Typically, MJPEG frames vary in size based on size and hence, UVC does not pose a restriction if MJPEG data format is used. In detail, the descriptor module 50 streams the YIN or RAW data formats by representing them as MJPEG data format in UVC descriptors and thereby avoiding any frame size restrictions and enable the descriptor module 50 to stream any frame size dynamically in a single VS_FORMAT and VS_FRAME configuration.

In addition, the system 10 includes a streaming application layer 60 operatively coupled to the connection interface 30. In one embodiment, the streaming application layer 60 may be built on top of UVC driver and may receive the initial frames. The streaming application layer 60 analyses the initial frame size and the compressed data format based on the coordinates provided by the video class extension module 40. The streaming application layer 60 also displays the stream of images corresponding to the region of interest in a resultant frame size upon interpretation to implement the region of interest-based streaming. More specifically, the interpretation and display of the initial frames is done with the information made available through video control extension module 40 which sets and receive current coordinates $X_0$, $X_1$, $Y_0$ and $Y_1$ along with the actual format of the frames sent. Upon interpretation, the stream of images corresponding to the region of interest may be displayed in a resultant frame size. The resultant frame size is corresponding to the region of interest. In one embodiment, the stream of images corresponding to the region of interest may be displayed on a user display device. In such an embodiment, the user display device may include a mobile phone, a tablet, a laptop, a personal digital assistance (PDA) or the like.

In one embodiment, the system 10 may perform anomaly detection and recording process. In such an embodiment, the image acquisition unit 20 which is part of leakage detection system in an industry may look at a wide field of view covering several machines and piping systems. The detection involves constantly verifying any leakage over this entire field of view. Once the detection is complete, the image acquisition unit 20 identify the region in which there is a leak. Further, the image acquisition unit 20 streams the region of leak alone at a higher frame rate so that the amount of leak and its rate can be easily visualised and recorded. Such advantage over UVC 1.0 brings in lot of flexibility to implement this feature in the conventional systems.

In another embodiment, the system 10 may perform activity tracking in surveillance. In such an embodiment, the region of interest based streaming camera may be a good assist to an activity tracking system. The surveillance camera which looks at an entire room or any outdoor scene my require high resolution for detecting and recognizing people, face or any vehicles. However, once the detection is complete, next step is tracking the activity of the detected person or object. The camera which can stream only the selected ROI at higher frame rate helps in this case and with UVC 1.0, it is even more preferable.

In yet another embodiment, the system 10 may perform eye detection and pupil tracking. In such an embodiment, the pupil tracking is a highly popular application of an imaging system which involves detection of the eye of a person and tracking the pupil. Detecting an eye involves high resolution camera streaming requirement. However, once the eye's region is detected, tracking the pupil has to be done at a higher frame rate. The region of interest-based streaming may stream only the region where eye is present and help track the pupil at very high frame rates. Having UVC 1.0 compatibility is an added advantage.

Figure 2:
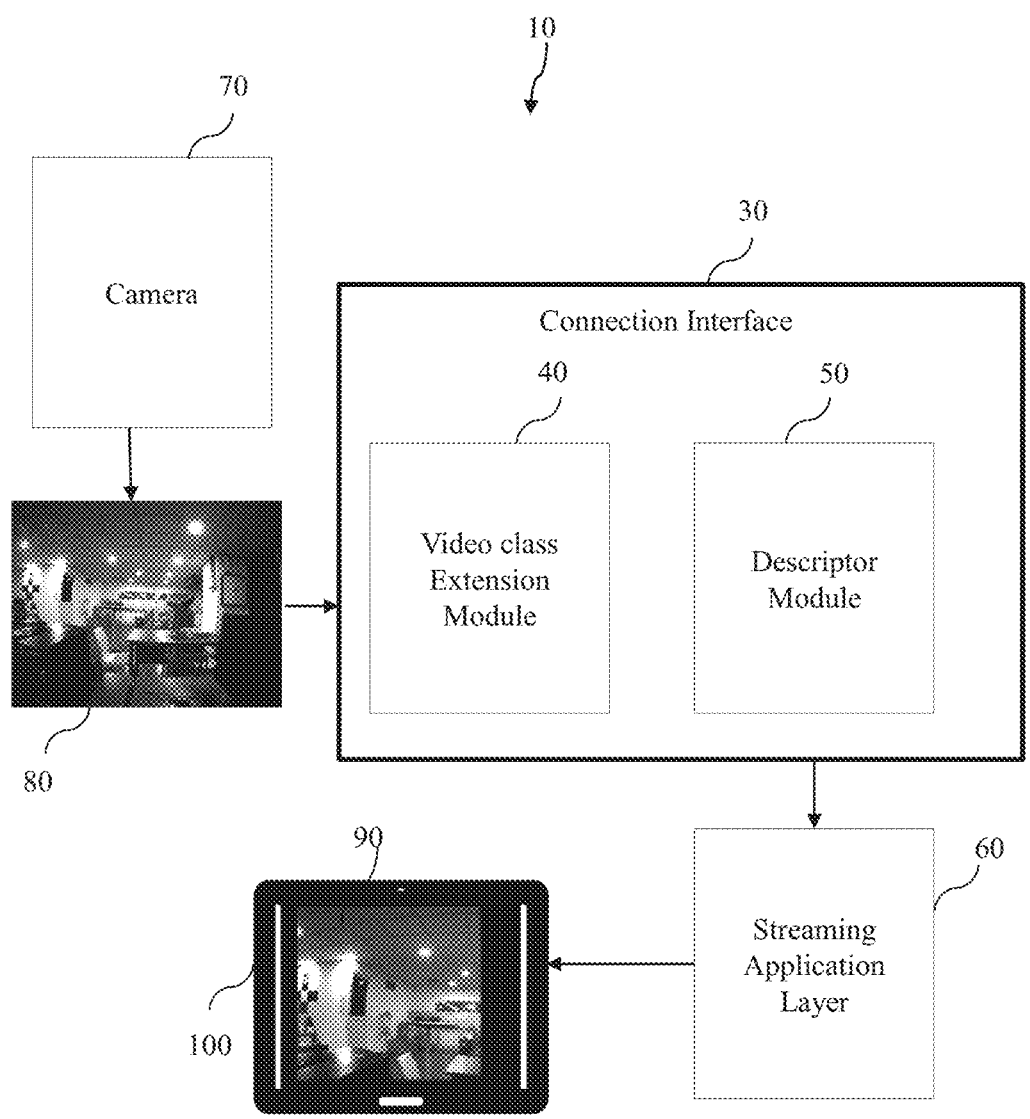
FIG. 2 is a block diagram representation of an exemplary system for implementation of region of interest-based streaming of FIG. 1 in accordance with an embodiment of the present disclosure.

FIG. 2 is a block diagram representation of an exemplary system 10 for implementation of region of interest-based streaming of FIG. 1 in accordance with an embodiment of the present disclosure. Consider an example where a video camera 70 is used to capture a video 80 of a room. The video camera 70 is substantially similar to the image acquisition unit 20 of FIG. 1. The video camera 70 supports the USB video device class (UVC) and collects device drives and an API that supports streaming video on an operating system and uses the UVC driver. In addition, the video camera 70 properties may be set by a streaming application layer 60 which is built on top of the UVC driver. In such case, the streaming application layer 60 instructs the video camera to use the YUV colour space to capture stream of images 80. In UVC 1.0, the frame size of a configuration is defined by width, height and bits per pixel. The frame size is defined in VS_FORMAT and V_FRAME descriptors.

In order to implement region of interest-based streaming in UVC camera that streams uncompressed data formats, the descriptor module 50 receives the capabilities associated with the video 80 of the room captured by the video camera. The capabilities include an initial frame size, a predefined data format and a region of interest. The descriptor module 50 uses the property of VS_FORMAT_MJPEG which is a compressed data format and represent the configuration that the camera supports as the compressed data type, which may stream image frames with no restriction on the frame size. In general, MJPEG frames vary in size based on size and hence UVC does not pose a restriction if MJPEG data format is used. Further, the descriptor module 50 streams YUV or RAW data formats by representing them as VS_FORMAT_MJPEG in UVC descriptors and thereby streaming any frame size dynamically in a single VS_FORMAT and VS_FRAME configuration.

To complete the implementation of region of interest-based streaming, the video class extension module 40 adds a custom control which specifies the four coordinates ($X_0$, $X_1$, $Y_0$ and $Y_1$) of the region of interest 90 in the video, where $X_0$, $X_1$ are the minimum and maximum limits in width respectively and $Y_0$, $Y_1$ are the minimum and maximum limits in height respectively. Consequently, the streaming application layer 60 built on top of UVC driver may receive the frames of the region of interest 90. The streaming application layer 60 sets and receives the current coordinates $X_0$, $X_1$, $Y_0$ and $Y_1$ and the actual format of the frames sent. Upon receiving the coordinates, the streaming application layer 60 analyses the initial frame size and the compressed data format based on the coordinates provided by the video class extension module 40. As a result, the streaming application layer 60 displays the region of interest 90 (a small desired portion of the room) corresponding to the video 80 of the room in a resultant frame size on a display device 100 of the user without compromising the quality of the video 80.

Figure 3:
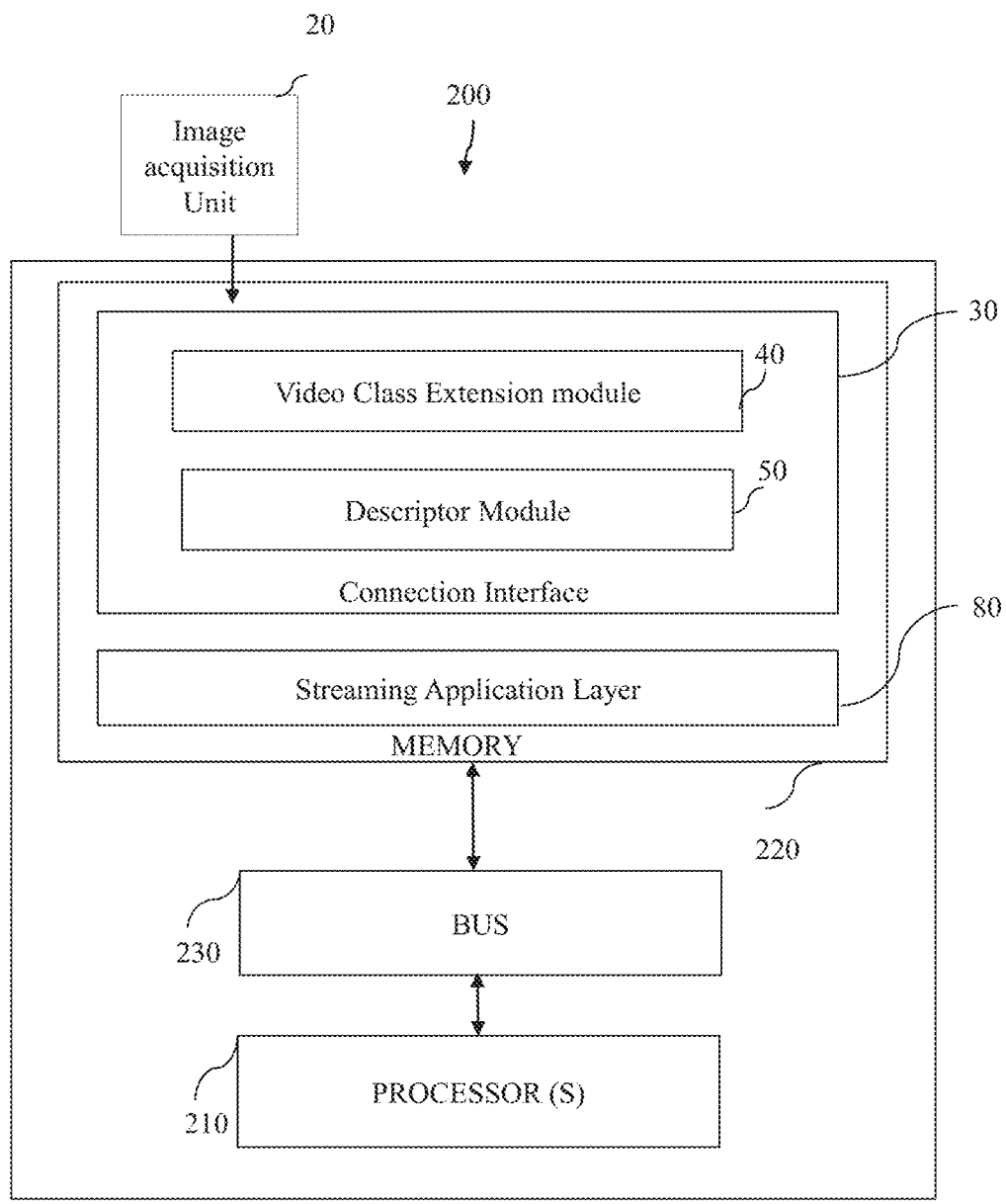
FIG. 3 is a computer or a server for the system for classification of the customer query in accordance with an embodiment of the present disclosure.

FIG. 3 is a computer or a server 200 for the system 10 for classification of the customer query in accordance with an embodiment of the present disclosure. The server includes processors 210, and memory 220 operatively coupled to the bus 230. The processors 210, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, CPU, GPU or any other type of processing circuit, or a combination thereof.

The memory 220 includes a plurality of subsystems stored in the form of executable program which instructs the processor 210 to perform the method 250 steps illustrated in FIG. 1. The memory 220 has following subsystems: the connection interface 30 including the descriptor module 50 and the video class extension module 40 and the streaming application layer 60.

The image acquisition unit 20 captures a stream of images and transmit the stream of images to the connection interface 30. The connection interface 30 is operatively coupled to the image acquisition unit 20. The connection interface 30 includes a video class extension module 40 configured to provide a plurality of coordinates corresponding to the region of interest of the stream of images. The connection interface 30 also includes a descriptor module 50 configured to receive a plurality of capabilities associated with the stream of images captured by the image acquisition unit 20, where the plurality of capabilities includes an initial frame size, a predefined data format and a region of interest. The descriptor module 50 is also configured to stream the predefined data format by representing the predefined data format as a compressed data format thereby streaming the initial frame size dynamically in a single video stream format and a video frame configuration.

The memory 220 further includes a streaming application layer 60 configured to analyze the initial frame size and the compressed data format based on the plurality of coordinates provided by the video class extension module 40. The streaming application layer 60 is further configured to display the stream of images corresponding to the region of interest in a resultant frame size upon interpretation to implement the region of interest-based streaming.

Figure 4:
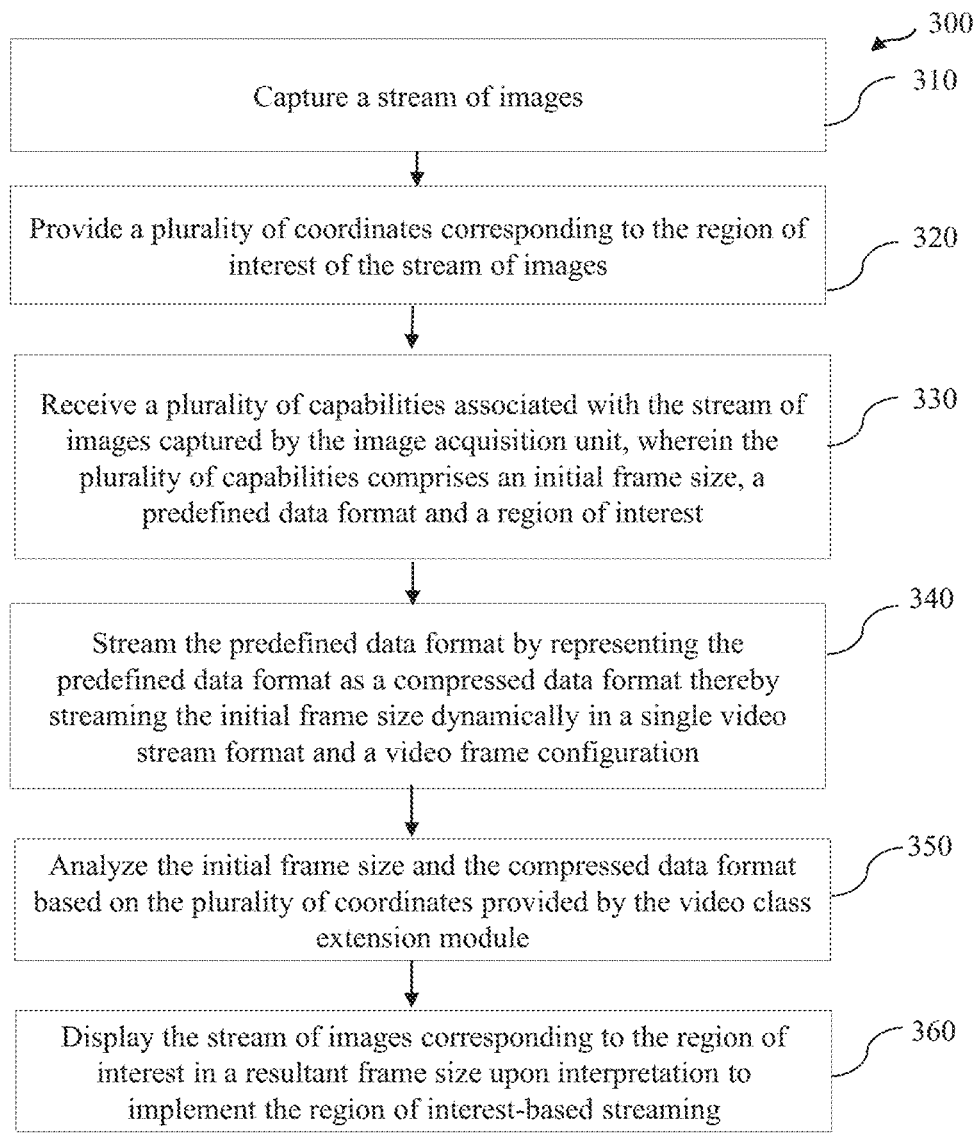
FIG. 4 is a flow chart representing the steps involved in a method for implementation of region of interest-based streaming in accordance with an embodiment of the present disclosure.

FIG. 4 is a flow chart representing the steps involved in a method 300 for implementation of region of interest-based streaming in accordance with an embodiment of the present disclosure. The method 300 includes capturing a stream of images in step 310. In one embodiment, capturing a stream of images may include capturing a stream of images by an image acquisition unit. In a specific embodiment, capturing a stream of images may include capturing a stream of images an RGB camera, a YUV camera, a gray scale, an IR camera or a depth camera.

The method 300 further includes providing coordinates corresponding to the region of interest of the stream of images in step 320. In one embodiment, providing coordinates corresponding to the region of interest of the stream of images may include providing coordinates corresponding to the region of interest of the stream of images by a video class extension module of a connection interface. In a specific embodiment, providing coordinates corresponding to the region of interest of the stream of images may include defining a maximum limit and a minimum limit of height and width of the region of interest. The video class extension module adds a custom control which specifies the four coordinates of the images. The coordinates may be represented by $X_0$, $X_1$ which are the minimum and maximum limits in width and $Y_0$, $Y_1$ which are the minimum and maximum limits in height.

Furthermore, the method 300 includes receiving capabilities associated with the stream of images captured by the image acquisition unit. The capabilities include an initial frame size, a predefined data format and a region of interest in step 330. In one embodiment, receiving capabilities associated with the stream of images may include receiving capabilities associated with the stream of images by a descriptor module of the connection interface. In one embodiment, the frame size of a configuration is defined by width, height and bits per pixel. The frame size may be defined in VS_FORMAT and VS_FRAME descriptors. In a specific embodiment, the predefined data format may include a YUV data format or a raw data format.

The method 300 further includes streaming the predefined data format by representing the predefined data format as a compressed data format thereby streaming the initial frame size dynamically in a single video stream format and a video frame configuration in step 340. In one embodiment, streaming the predefined data format by representing the predefined data format as a compressed data format may include streaming the predefined data format by representing the predefined data format as a compressed data format by the descriptor module of the connection interface. In a specific embodiment, the compressed data format may include a MJPEG data format. More specifically, the descriptor module uses the property of MJPEG format which is a compressed data format and represent the configuration that the image acquisition unit supports as the compressed data type, and further may stream image frames with no restriction on the frame size. the descriptor module streams the YUV or RAW data formats by representing them as MJPEG data format in UVC descriptors and thereby avoiding any frame size restrictions and enable the descriptor module to stream any frame size dynamically in a single VS_FORMAT and VS_FRAME configuration.

Subsequently, the method 300 includes analysing the initial frame size and the compressed data format based on the coordinates provided by the video class extension module in step 350. In one embodiment, analysing the initial frame size and the compressed data format may include includes analysing the initial frame size and the compressed data format by a streaming application layer. In such an embodiment, the application may be built on a UVC driver. The method 300 further includes displaying the stream of images corresponding to the region of interest in a resultant frame size upon interpretation to implement the region of interest-based streaming in step 360. In one embodiment, displaying the stream of images corresponding to the region of interest may include displaying the stream of images corresponding to the region of interest by the streaming application layer. Upon interpretation, the stream of images corresponding to the region of interest may be displayed in a resultant frame size. The resultant frame size is corresponding to the region of interest. In one embodiment, the stream of images corresponding to the region of interest may be displayed on a user display device. In such an embodiment, the user display device may include a mobile phone, a tablet, a laptop, a personal digital assistance (PDA) or the like.

Various embodiments of the system and method for implementation of region of interest based streaming as described above makes use of compressed data format such as MJPEG and represents that the camera streams compressed data in UVC but send uncompressed data instead through the same interface. By representing that the camera supports compressed MJPEG data format, the camera may stream varying frame sizes since there is no frame size restriction in case of MJPEG in UVC. As a result, region of interest-based streaming may be implemented and pixel coordinates to be streamed max easily be received as a custom control through UVC extension. Further, the actual ROI to be streamed for uncompressed YIN or RAW formats may be varied from frame to frame without frame size restriction. The system enables the UVC1.0 to produce streaming over the ROI.

It will be understood by those skilled in the art that the foregoing general description and the detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method 250 in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for implementation of a region of interest based streaming comprising:
    an image acquisition unit configured to capture a stream of images;
    a connection interface operatively coupled to the image acquisition unit, wherein the connection interface comprises:
        a video class extension module configured to provide a plurality of coordinates corresponding to a region of interest of the stream of images, wherein the video class extension module is configured to add a custom control to indicate four coordinates of the plurality of coordinates to define a maximum limit and a minimum limit of height and width respectively of the region of interest;
    a descriptor module configured to:
        receive a plurality of capabilities associated with the stream of images captured by the image acquisition unit, wherein the plurality of capabilities comprises an initial frame size, a predefined data format and a region of interest; and
        stream the predefined data format by representing the predefined data format as a compressed data format thereby streaming the initial frame size dynamically in a single video stream format and a video frame configuration, with no restriction on frame size, wherein the no restriction on frame size is obtained by using an MJPEG data format as compressed data format, wherein the MJPEG data format provides MJPEG frames vary in size based on requested size, thereby the descriptor module makes the MJPEG frames unrestricted; and
    a streaming application layer configured to:
        analyze the initial frame size and unrestricted compressed data format based on the plurality of coordinates provided by the video class extension module; and
        display the stream of images corresponding to the region of interest in a resultant frame size, upon analysis, to implement the region of interest-based streaming.

2. The system as claimed in claim 1, wherein the image acquisition unit comprises an RGB camera, a YUV camera, a gray scale, an IR camera or a depth camera.

3. The system as claimed in claim 1, wherein the predefined data format comprises a YUV data format or a raw data format.

4. The system as claimed in claim 1, wherein the streaming application layer is built on a USB video class driver.

5. The system as claimed in claim 1, wherein the initial frame size comprises a frame size configuration having width, height and bits per pixel.

6. The system as claimed in claim 1, comprising an anomaly detection module coupled to the image acquisition module, wherein the anomaly detection module is configured to perform anomaly detection and recording process to constantly verify a leakage in a field of view of the image acquisition unit by streaming the region of interest corresponding to the leak at a higher frame rate.

7. The system as claimed in claim 1, comprising an activity tracking module coupled to the image acquisition module, wherein the activity tracking module is configured to perform activity tracking in surveillance by streaming selected region of interest at a higher frame rate.

8. The system as claimed in claim 1, comprising an eye and pupil detection module coupled to the image acquisition module, wherein the eye and pupil detection module is configured to perform eye and pupil detection and tracking by streaming the region of interest at a plurality of very high frame rates.

9. A method for implementation of region of interest based streaming comprising:
    capturing, by an image acquisition unit, a stream of images;
    providing, by a video class extension module, a plurality of coordinates corresponding to a region of interest of the stream of images, wherein providing the plurality of coordinates comprises adding a custom control to indicate four coordinates of the plurality of coordinates to define a maximum limit and a minimum limit of height and width respectively of the region of interest;
    receiving, by a descriptor module, a plurality of capabilities associated with the stream of images captured by the image acquisition unit, wherein the plurality of capabilities comprises an initial frame size, a predefined data format and a region of interest;
    streaming, by the descriptor module, the predefined data format by representing the predefined data format as a compressed data format thereby streaming the initial frame size dynamically in a single video stream format and a video frame configuration, with no restrictions on a frame size, wherein the no restriction on frame size is obtained by using an MJPEG data format as compressed data format, wherein the MJPEG data format provides MJPEG frames vary in size based on requested size, thereby the descriptor module makes the MJPEG frames unrestricted;

analysing, by a streaming application layer, the initial frame size and unrestricted compressed data format based on the plurality of coordinates provided by the video class extension module; and displaying, by the streaming application layer, the stream of images corresponding to the region of interest in a resultant frame size, upon analysis, to implement the region of interest-based streaming.

10. The method as claimed in claim 9, wherein providing the plurality of coordinates comprises defining a maximum limit and a minimum limit of height and width of the region of interest.

\* \* \* \* \*